(12) United States Patent
Muller et al.

(10) Patent No.: US 12,411,043 B2
(45) Date of Patent: Sep. 9, 2025

(54) NO-REF-SIGNAL SLOPE SPECTROSCOPIC MEASUREMENT

(71) Applicant: Repligen Corporation, Waltham, MA (US)

(72) Inventors: Matthew Muller, Cranford, NJ (US); Richard Hall, III, Bernardsville, NJ (US); Yusheng Zhang, Stewartsville, NJ (US); Peter Halatin, Howell, NJ (US)

(73) Assignee: Repligen Corporation, Waltham, MA (US)

( * ) Notice: Subject to any disclaimer, the term of this patent is extended or adjusted under 35 U.S.C. 154(b) by 177 days.

(21) Appl. No.: 18/198,513

(22) Filed: May 17, 2023

(65) Prior Publication Data

US 2023/0375407 A1 Nov. 23, 2023

Related U.S. Application Data

(60) Provisional application No. 63/343,357, filed on May 18, 2022.

(51) Int. Cl.
*G01J 3/42* (2006.01)
*G01J 3/10* (2006.01)
(Continued)

(52) U.S. Cl.
CPC . *G01J 3/42* (2013.01); *G01J 3/10* (2013.01); *G01N 21/255* (2013.01); *G01N 21/3103* (2013.01)

(58) Field of Classification Search
CPC . G01J 3/42; G01J 3/10; G01N 21/255; G01N 21/3103; G01N 21/33;
(Continued)

(56) References Cited

U.S. PATENT DOCUMENTS 4,634,277 A 1/1987 Stockdale
6,704,109 B2 3/2004 Wu et al.
(Continued)

FOREIGN PATENT DOCUMENTS

AU 2011214172 A1 8/2012
AU 2013205020 A1 5/2013

OTHER PUBLICATIONS

International Search Report and Written Opinion for the International Application No. PCT/US2023/022571, mailed Aug. 3, 2023, 13 pages.
(Continued)

*Primary Examiner* — Michael P LaPage
*Assistant Examiner* — Carlos Perez-Guzman
(74) *Attorney, Agent, or Firm* — KDW Firm PLLC (57) ABSTRACT

A method includes determining whether a variation in probe radiation intensity meets a stability criterion; directing the probe radiation through a probe, when the probe is disposed at a first position, defining a first path length $L_1$ of the probe radiation through the fluid sample; measuring a transmitted intensity $I_1$ of the probe radiation after passing through the fluid sample when the probe is disposed at the first position; directing the probe radiation through the probe when the probe is disposed at a second position, defining a second path length $L_2$ of the probe radiation through the fluid sample; measuring a transmitted intensity $I_2$ of the probe radiation after passing through the fluid sample when the probe is disposed at the second position; and determining a concentration C of a material in the fluid sample based upon $L_1$, $I_1$, $L_2$, and $I_2$, when the stability criterion is met.

21 Claims, 6 Drawing Sheets

(51) Int. Cl.
*G01N 21/25* (2006.01)
*G01N 21/31* (2006.01)

(58) Field of Classification Search
CPC .............. G01N 21/8507; G01N 21/31; G01N 21/0303; G01N 21/85; G01N 2021/8528; G01N 2021/0307; G01N 2201/0662; G01N 2201/08; G01N 2201/0627
See application file for complete search history.

(56) References Cited

U.S. PATENT DOCUMENTS

| | | | |
|---|---|---|---|
| 6,879,741 B2 | 4/2005 | Salerno | |
| 7,759,651 B2 | 7/2010 | Knight | |
| 7,808,641 B2 | 10/2010 | Salerno | |
| 7,980,745 B2 | 7/2011 | Shanbaky | |
| 9,404,851 B2 | 8/2016 | Shih | |
| 9,952,350 B1 | 4/2018 | DiFoggio | |
| 10,830,778 B2 | 11/2020 | Salerno | |
| 11,300,447 B2 | 4/2022 | Shih | |
| 2015/0098082 A1 | 4/2015 | Wang | |
| 2015/0244145 A1 | 8/2015 | Taubman et al. | |
| 2015/0268095 A1 | 9/2015 | Kovacich | |
| 2017/0356848 A1 | 12/2017 | Ehring | |
| 2019/0212258 A1 | 7/2019 | Harrison | |
| 2020/0003940 A1 | 1/2020 | Smith et al. | |
| 2021/0096128 A1 | 4/2021 | Peyser | |
| 2022/0026160 A1 | 1/2022 | Perreault | |
| 2022/0042969 A1 | 2/2022 | Harrison | |
| 2022/0268628 A1 | 8/2022 | Gantier | |
| 2022/0397581 A1* | 12/2022 | Ando | G01N 35/00584 |
| 2023/0002801 A1 | 1/2023 | Dutta | |
| 2023/0111094 A1* | 4/2023 | Matsui | G02B 21/365 |
| | | | 348/79 |

OTHER PUBLICATIONS

The International Preliminary Report on Patentability mailed Nov. 28, 2024, for corresponding PCT/ US2023/022571 (seven (7) pages.
International Search Report and Written Opinion for the International Application No. PCT/US2023/022572, mailed Aug. 3, 2023, 12 pages.
International Search Report and Written Opinion for the International Application No. PCT/US2023/022577, mailed Aug. 8, 2023, 14 pages.
Marcus et al., "Optical path length and absorption cross section optimization for high sensitivity ozone concentration measurement," Sensors and Actuators B: Chemical, vol. 221, 2015, pp. 570-575.

* cited by examiner

NO-REF-SIGNAL SLOPE SPECTROSCOPIC MEASUREMENT

CROSS-REFERENCE TO RELATED APPLICATIONS

The present application claims the benefit of priority under 35 U.S.C. § 119 to U.S. Provisional Application Ser. No. 63/343,357, entitled "NO-REF-SIGNAL SLOPE SPECTROSCOPIC MEASUREMENT" filed on May 18, 2022, the entirety of which application is incorporated by reference herein for all purposes.

BACKGROUND OF THE DISCLOSURE

Field of the Disclosure

Embodiments of the disclosure relate generally to spectroscopic analysis, and more particularly to solution analysis using light source coupled with a variable path length measurement system.

Discussion of Related Art

Absorption spectroscopy is used to measure composition and/or properties of a material in any phase, gas, liquid, solid. For example, the optical absorption spectra of liquid substances may be measured to determine concentration or other properties of a species of interest, within a liquid medium. An absorption spectra may provide the distribution of light attenuation (due to absorbance) as a function of light wavelength. In a known spectrophotometer the sample substance to be studied is placed in a transparent container, so that electromagnetic radiation (light) of a known wavelength, $\lambda$, (i.e. ultraviolet, infrared, visible, etc.) and intensity I may be measured after passing through the transparent container, using a suitable detector.

Known ultraviolet (UV)/visible spectrophotometers utilize containers such as standard cuvettes which containers may have a standard cm path length through which the incident light is conducted within the liquid containing the substance to be measured. For a sample consisting of a single homogeneous substance having a concentration c, the light transmitted through the sample will follow a relationship know as Beer's Law: $A=\varepsilon CL$ where A is the absorbance (also known as the optical density (OD) of the sample at wavelength $\lambda$ where OD=the $-\log$ of the ratio of transmitted light to the incident light), $\varepsilon$ is the absorptivity or extinction coefficient (normally at constant at a given wavelength), C is the concentration of the sample, and L is the path length of light through the sample. Thus, in principle, information regarding concentration of the homogenous substance may be determined based upon recorded light intensity of a signal passing through the sample container. However, under some circumstances, the determination of concentration in such apparatus may be difficult. Often a compound of interest in solution is highly concentrated. For example, certain biological samples, such as proteins, DNA or RNA are often isolated in concentrations that fall outside the linear range of the spectrophotometer when absorbance is measured. Therefore, dilution of the sample is often required to measure an absorbance value that falls within the linear range of the instrument. Frequently multiple dilutions of the sample are required which leads to both dilution errors and the removal of the sample diluted for any downstream application. It is therefore useful to take existing samples without knowledge of the possible concentration and to measure the absorption of these samples without dilution. One resulting feature common to these known ultraviolet (UV)/visible spectrophotometers is that the path length L be known with great accuracy so that an accurate concentration measurement can be made.

To address these challenges, a technology based upon a variable path length spectrophotometer has recently been developed. This type of spectroscopy system may generally employ a known light source, such as a source based upon a UV/visible spectrophotometer. Light from the UV/visible spectrophotometer is then directed to a special probe in an analysis instrument that is arranged to dynamically change the path length L in a special sample chamber during an absorbance measurement. Thus, the intensity of transmitted radiation that is generated from the UV/visible spectrophotometer source is detected after passing through the sample chamber, while the movement of the probe varies the path length L through multiple different positions. As such, a series of measurements are produced that generate a different value of A for each different value of l, in a manner that does not require knowledge of any particular path length l, in order to determine the concentration C.

While such variable path length spectroscopy may be adapted for in-line measurements of a sample, while conducted through a production system, for example, the instrumentation required for such measurement scenarios may require extensive installation effort and an undue amount of space. For example, a UV/visible photospectrometer system used as a light source may occupy several cubic feet of space and may have a weight on the order of several tens of kilograms. Moreover, the determination of A generally requires that multiple measurements of intensity may be required for each sample measurement taken at a given path length L.

With respect to these and other considerations, the present disclosure is provided.

SUMMARY OF THE DISCLOSURE

In one embodiment, a method of determining a concentration of a material may include determining whether a variation in an intensity of a probe radiation emitted by a light source of an absorbance spectroscopy system meets a stability criterion. The method may further include: directing the probe radiation through a probe when the probe is disposed at a first position, defining a first path length $L_1$ of the probe radiation through the fluid sample, and measuring a transmitted intensity $I_1$ of the probe radiation after passing through the fluid sample when the probe is disposed at the first position. The method may also include directing the probe radiation through the probe when the probe is disposed at a second position, defining a second path length $L_2$ of the probe radiation through the fluid sample, and measuring a transmitted intensity $I_2$ of the probe radiation after passing through the fluid sample when the probe is disposed at the second position. The method may additionally include determining a concentration C of a material in the fluid sample based upon $L_1$, $I_1$, $L_2$, and $I_2$, when the stability criterion is met.

In another embodiment, there is provided a non-transitory computer-readable storage medium storing computer-readable program code executable by a processor to determine whether a variation in an intensity of a probe radiation emitted by a light source of an absorbance spectroscopy system meets a stability criterion; cause a light source to direct the probe radiation through a probe when the probe is disposed at a first position, defining a first path length $L_1$ of the probe radiation through the fluid sample; receive a transmitted intensity $I_1$ of the probe radiation after passing through the fluid sample; cause the light source to direct the probe radiation through the probe when the probe is disposed at a second position, defining a second path length $L_2$ of the probe radiation through the fluid sample; receive a transmitted intensity $I_2$ of the probe radiation after passing through the fluid sample; and determine a concentration C of a material in the fluid sample based upon $L_1$, $I_1$, $L_2$, and $I_2$ when the variation in the intensity meets the stability criterion.

In a further embodiment, a measurement apparatus is provided, including a light source, to generate a probe signal; and a measurement instrument, to receive the probe signal. The measurement instrument may include a sample vessel to contain a fluid sample, the sample vessel comprising a vessel wall and a probe, arranged to direct the probe signal through the sample vessel, wherein the probe is movable along a probe direction with respect to the vessel wall, so as to change a path length L of the probe signal through the fluid sample. The measurement apparatus may also include a detector, disposed to receive the probe signal after passing through the vessel wall, and a control system. The control system may be arranged to: determine whether a variation in an intensity of a probe radiation emitted by the light source meets a stability criterion; and calculate a concentration C of a material in the fluid sample based upon a measured change in intensity of the probe signal as a function of a change in the path length L, when the variation in the intensity meets the stability criterion.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

According to embodiments of the disclosure, techniques and apparatus are provided that improve absorbance measurement based upon a variable-pathlength-measurement (VPT) apparatus architecture. The present embodiments in particular provide a streamlined and dynamic approach to determining concentration of a material in a fluid sample. The approach of the present embodiments employs multiple intensity measurements that are recorded as radiation is transmitted through the fluid sample while the path length of the radiation through the fluid sample is varied. As detailed below, and in contrast to known absorbance spectroscopy technology, the present embodiments determine absorbance changes of the fluid sample, and thus, the concentration C of a material within the fluid sample without the need to perform reference signal measurements.

Figure 1A:
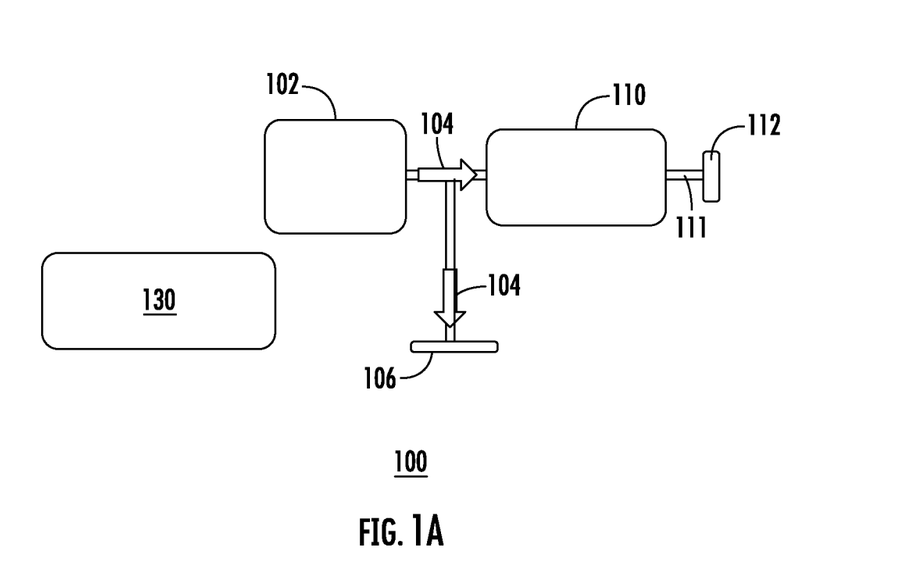
FIG. 1A depicts an absorption spectroscopy apparatus, in accordance with embodiments of the disclosure.

FIG. 1A depicts an absorption spectroscopy apparatus, shown as system 100, in accordance with embodiments of the disclosure. The system 100 may include a compact light source 102, and a measurement instrument 110, coupled to the compact light source 102, and a detector 112, disposed next to the measurement instrument 110. The compact light source 102 may include a light emitting diode (LED) to generate radiation 104 at a targeted wavelength, such as in the UV to IR range, and in particular, in a range of 190 nm to 1100 nm, or 250 nm to 1000 nm according to various non-limiting embodiments. In some examples, the compact light source 102 may represent a single LED or an array of LEDs that emit radiation at a single wavelength. In other embodiments, a plurality of LEDs may be provided, where a given LED emits radiation at a wavelength that differs from the wavelength of another LED.

The measurement instrument 110 is arranged to contain a fluid sample that includes a material of substance to be measured, where details of variants of measurement instrument 110 are discussed below. The detector 112 is arranged to detect intensity I of the radiation transmitted through the given fluid sample that is contained in measurement instrument 110, which radiation is shown as attenuated radiation 111. In accordance with Beer Lamber law, shown in Eq. 1, below, the concentration C of a material in a sample may be determined as A/eL, where A is the absorbance and e is the molar absorptivity.

$$\text{Beer Lambert Law: } A = \epsilon l C \tag{1}$$

In turn, A is determined as $\log_{10}(I_0/I)$, where $I_0$ is the intensity of the radiation 104, and I is the intensity of the attenuated radiation 111. To measure the value of $I_0$, the system 100 further includes a reference detector 106, to receive a portion of the radiation 104, before the radiation 104 is conducted through the measurement instrument 110. This parameter is used to directly calculate absorbance, in accordance the absorbance equation, Eq 2:

$$\text{Absorbance Equation: } A = \log_{10}\left(\frac{I_0}{I}\right) = \log_{10}(I_0) - \log_{10}(I) \tag{2}$$

$A$ = Absorbance $I_0$ = Intensity of Incident Light $I$ = Intensity of Light That Passed Though Sample Thus, at a given measurement instance, absorbance A will be determined when the detector 112 measures/based upon the attenuated radiation 111, while the reference detector 106 measures $I_0$. According to the approach of slope spectroscopy, the Beer Lambert law may be recast as A/L, =e C, and extended further to ΔA/ΔL, =e C, where the entity ΔA/ΔL is deemed a slope parameter m. In operation, the system 100 will operate according to the principles of slope spectroscopy to vary the path length L through which distance the radiation 104 travels, in order to determine the change in absorbance A as a function of change in path length L, thus, directly determining the value of C for a given substance, given knowledge of e for that substance.

Figure 2:
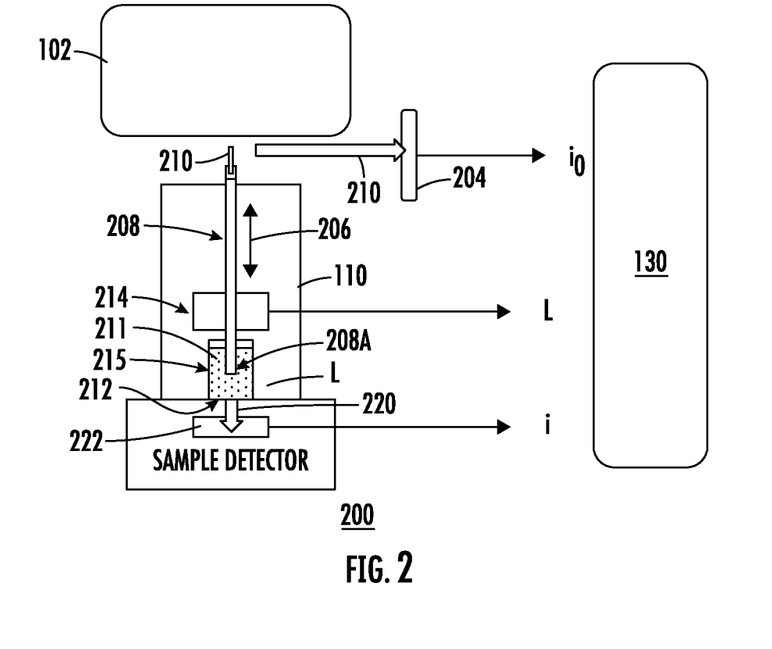
FIG. 2 depicts an absorption spectroscopy apparatus, in accordance with embodiments of the disclosure.

The details of the operation of variants of the measurement instrument 110 are discussed below with respect to FIGS. 2 and 3. However, in brief, the measurement instrument 110 employs a movable optical probe (as shown in FIG. 2, discussed in more detail below) to vary the path length L of the radiation 104 that is transmitted through a given fluid sample (not shown in FIG. 1A, but see fluid sample 211 in FIG. 2) that is present in the measurement instrument 110. Because the intensity of the attenuated radiation 111 will vary according to changes in path length L, the change in I as a function of path length L change can be used to directly determine the change in absorbance A as a function of change in path length L. Thus, with knowledge of $I_0$ given by reference detector 106 the system 100 may be employed to readily determine the concentration C of a material in a fluid sample, by varying the path length (to determine Dl) of the radiation 104 as the radiation 104 passes through measurement instrument 110, and detecting changes in intensity of the attenuated radiation 111 (to determine DA).

Figure 1B:
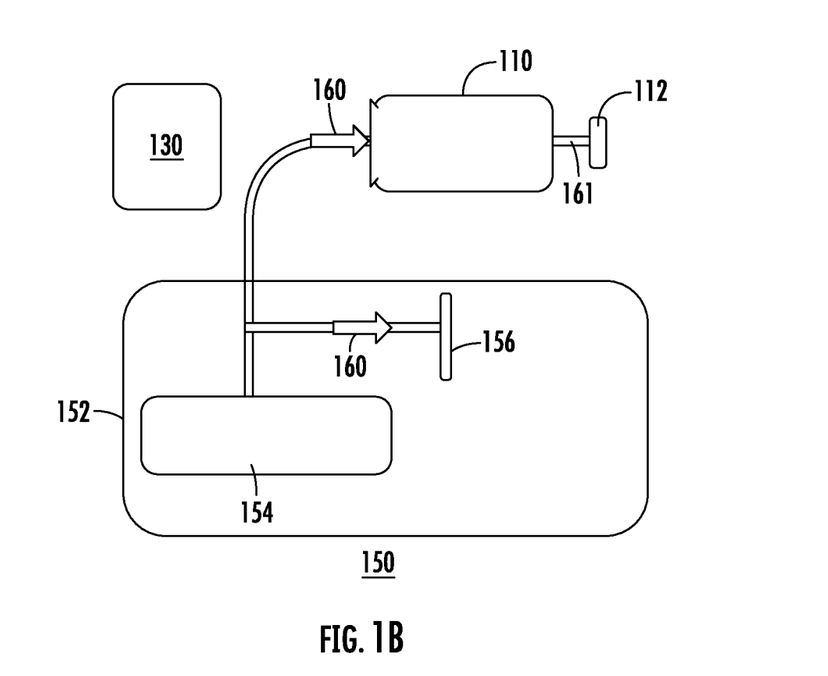
FIG. 1B depicts an absorption spectroscopy apparatus, in accordance with embodiments of the disclosure.
Figure 1C:
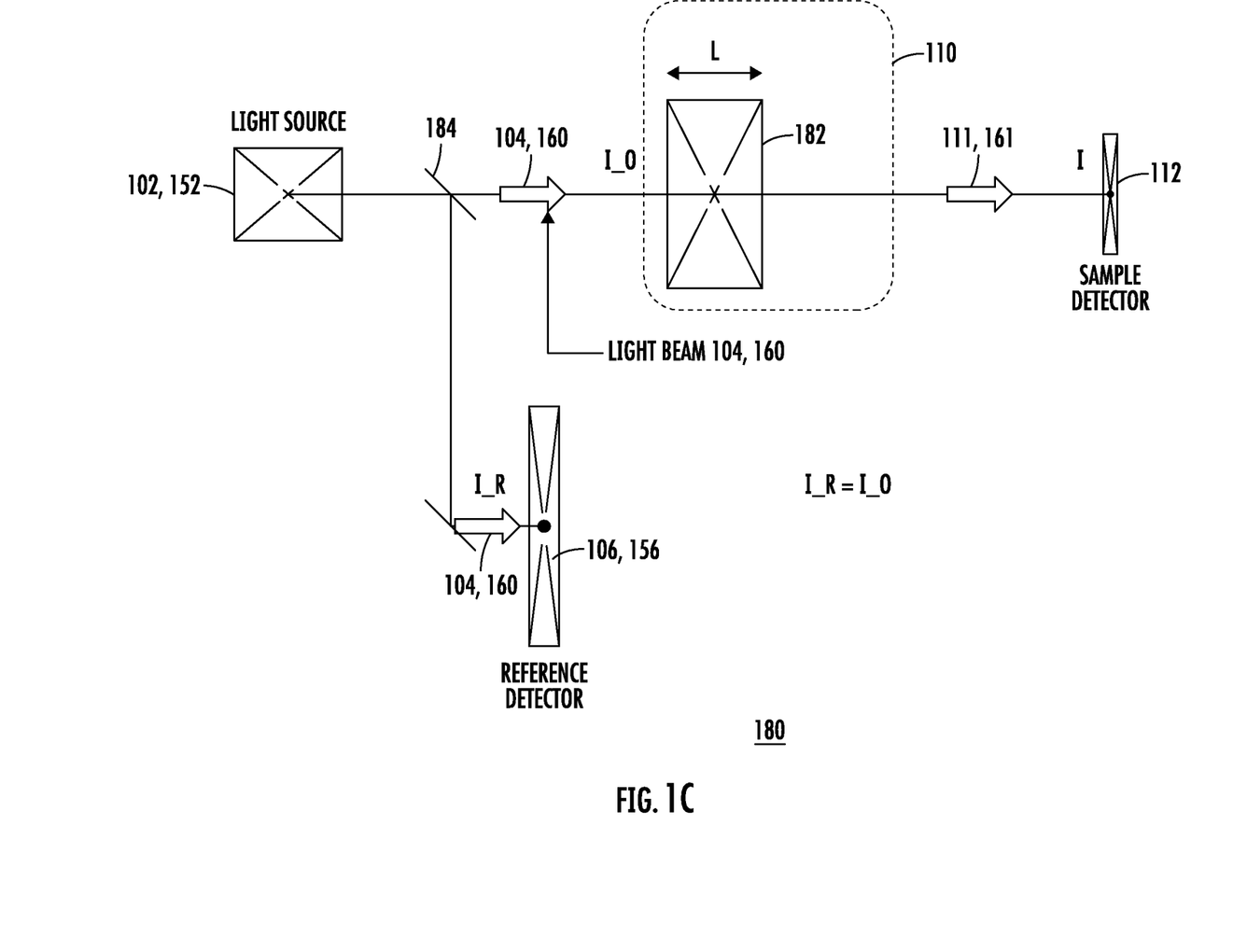
FIG. 1C provides an arrangement that illustrates the general geometry for determining concentration of a substance according to the principles of slope spectroscopy.

FIG. 1C provides an arrangement 180 that illustrates details of the geometry for determining concentration of a substance according to the principles of slope spectroscopy. In the arrangement 180, a light source, such as compact light source 102, directs radiation 104 through a sample 182, such as a fluid sample. The sample 182 attenuates or absorbs a portion of the radiation 104, so that the attenuated radiation, such as attenuated radiation 111, will generally exhibit a lesser intensity I, than the intensity $I_0$ of radiation 104. A beam splitter 184 or similar device, is provided to direct a portion of radiation 104 to the reference detector 106 without passing through the sample 182, in order to record the value of $I_0$. As noted above, within the measurement instrument 110, a movable probe may vary the path length L, while at the same time the change in absorbance A is measured. For each value of L, a measurement of intensity I, of attenuated radiation 111 is recorded, and a measurement of intensity $I_0$ of radiation 104 is recorded. In this manner, for a given change is path length, $\Delta L$, $\Delta A$ is determined as:

$$\Delta A = A2 - A1 = \log\frac{I02}{I2} - \log\frac{I01}{I1} \quad (3A)$$

$$= \log I1 - \log I2 + \log\frac{I02}{I01} \quad (3B)$$

FIG. 1B depicts an absorption spectroscopy apparatus, shown as system 150. This system may operate similarly to system 100, in order to determine concentration C of a substance in measurement instrument 110. where like components are labeled the same. A difference is that the system 100 employs a light source 152, which may be a broad spectrum light source, such as a known UV/vis/IR absorption spectroscopy apparatus, where radiation 160 represents light that may be generated over an interval of seconds or minutes over a broad radiation spectrum. Similarly to the system 100, the radiation 160 may be directed to a reference detector 156 to measure $I_0$, while the attenuated radiation 161 is measured at a detector 112, after passing through a fluid sample in measurement instrument 110.

In both the embodiments of FIG. 1A and FIG. 1B, a control system 130 is provided to facilitate streamlined and improved operation of the respect absorption spectroscopy measurements. In brief, the control system 130 may include a non-transitory computer readable storage medium including instructions that when executed, such as using an electronic processor, will perform one or more of the operations described below. The control system 130 may include various components including dedicated electronic controllers, communication interfaces routines, or algorithms to control operation of various components of the system 100 or system 150. The control system 130 may control operation of system 100 or system 150, including the operation of the systems in different operating modes. In a "standard" slope spectroscopy mode, concentration C is determined by determining ADA using measurements of I and $I_0$ for each value of L, as described above. In a "no-reference signal" mode or NRS slope spectroscopy mode, the system 100 or system 150 may operate to determine concentration C without measurement of $I_0$, as described below. The NRS mode of slope spectroscopy will afford greater flexibility and speed for conducting measurements, as well as potentially greater accuracy.

In accordance with embodiments of the disclosure, the NRS slope spectroscopy mode may be used or initiated routinely, or may be initiated when a certain stability criterion is met for operating an absorbance spectroscopy system, where the Eq. 3B for determining A may be simplified. The stability criterion may be met, for example, when a variation in intensity of absorbance is below a threshold value, as discussed further below. According to Eq. 3B (see supra), outlining the absorbance calculation according to the known slope spectroscopy approach, the change in absorbance $\Delta A$ between a first instance $t_1$ (corresponding to a first path length $L_1$) and a second instance $t_2$ (corresponding to a second path length $L_2$) is determined in part by the value of the parameter $$\log\frac{I02}{I01}.$$

Thus, the value of the ratio of the incident intensity at the second instance to the instant intensity at the first instance is required to calculate $\Delta A$. The measurement of these incident intensities using the reference detector 106 or reference detector 156 is useful, for example, since the intensity of incident light generated by a light source in general will vary with time, including between the time $t_1$ and time $t_2$. For example, using a known UV/vis/IR light source, such as light source 152, acquisition of a transmission spectrum, from which $I_1$ or $I_2$ are measured, may require many seconds or tens of seconds to complete. Thus, a known slope spectroscopy measurement will proceed as follows: a movable probe that directs the incident radiation through a fluid sample will be moved to a first position to set a first path length $L_1$, after which a transmission (absorbance) spectrum will be acquired from which spectrum $I_1$ is determined. The movable probe will then be moved to a second position to set a second path length $L_2$, after which a second transmission spectrum will be acquired to determine $I_2$. Thus, the elapsed time between measurement of $I_1$ and measurement of $I_2$, including time to acquire a transmission spectrum and move the probe, may be sufficiently long that drift in the incident intensity $I_0$ is to be expected, requiring the measurement of incident intensity before each measurement of transmitted intensity I. Moreover, the stability of a light source may vary from source to source, and may vary over time, leading to the need to measure $I_0$ for each measurement of I.

However, the present inventors have appreciated that under certain situations, the value of the term $$\log\frac{I02}{I01}.$$

may be sufficiently small, such that the novel NRS slope spectroscopy mode may be employed to measure ΔA and thus the concentration C of a substance of interest. Said differently, in a setup or calibration process, the incident intensity $I_0$ emitted from a compact light source 102 or light source 152 may be measured continuously or intermittently over a given time span to determine the stability of the light source. If the light source is sufficiently stable, the measurement of incident intensity, such as measurement of $I_{O2}$ and $I_{O1}$ may be omitted from a slope spectroscopy measurement process. In particular, to assess when to use the NRS slope spectroscopy mode, the term $$\log \frac{I02}{I01}$$

may be considered as a ΔAerr, meaning that this term expresses the difference between the actual change in absorbance ΔA (measurement of $I_{02}$ and $I_{01}$ is performed), and the calculated change in absorbance, when measurement of $I_{02}$ and $I_{01}$ is not performed. Thus, when the stability measurement for a setup process indicates that the variation in the value of $I_0$ is below a certain value for a certain time span, this variation indicates that the variation between the value of $I_{02}$ and $I_{01}$ for a given measurement interval, may also remain below that value during an actual slope spectroscopy measurement. Moreover, since $$\Delta Aerr = \log \frac{I02}{I01},$$

when the value of $I_{02}$ and $I_{01}$ are sufficiently close to one another, their ratio equals ~1, meaning ΔAerr equals to zero. Under this circumstance, measurement of $I_{02}$ and $I_{01}$ during an actual slope spectroscopy measurement may be omitted, without unduly affecting the calculated value of C which value is calculated simply as log I1–log I2. Thus, in the NRSS mode, just I and L need be measured as L is varied over time.

The determination of when the value of when instability of incident intensity is sufficiently low as to permit measurement using the novel NRS slope spectroscopy mode may be determined according to an application. However, in general, for situations where $I_0$ varies just slightly over a predefined time, this variation in incident intensity may be designated as ±α%. Accordingly, the term alpha may be defined as $$\alpha = \frac{I_{02}}{I_{01}} - 1.$$

Since the term $$\Delta Aerr = \log \frac{I02}{I01}$$

this means ΔAerr=log(1+α). Alternatively, for a determination of variability over any suitable period, involving any suitable number of measurements, a may be defined as $(I_{max}-I_{min})/I_{min}$ where $I_{max}$ is the maximum value of intensity of radiation recorded in the suitable period and $I_{min}$ is the minimum value of intensity recorded in that period.

Thus, depending upon the application, a limit on the maximum value of a may be established to determine when the NRS slope spectroscopy measurement mode is to be employed. In one example, for absorbance measurements regulated under the United States pharmacopeia (USP) guidelines for operation of UV-Vis spectrophotometers, USP requires absorbance deviation of less than +0.01. Thus, for slope spectroscopy measurements conducted in accordance with USP guidelines, 0.01>log(1+α), meaning that |α|<2.33%. Thus, in some embodiments a stability criterion may be met when the absorbance deviation is less than a certain value, such as less than ±0.03, less than ±0.02, or less than ±0.01. In the latter case, the stability criterion corresponds equivalently to when |α|<2.33%, where a may be defined by the equations set forth herein.

In one example, a slope spectroscopy apparatus, including a LED light source, generally arranged according to the embodiment of FIG. 1A, was used to determine source stability. Over a certain test period a maximum $I_{max}$ and minimum $I_{min}$ incident intensity were recorded with the following results:

$$\alpha = \frac{(I_{max} - I_{min})}{I_{min}} = \frac{(0.3095 - 0.3093)}{0.3093} = 0.0614\% \text{(for this data set)}$$

Thus, in the above example, with the value of a lying well below the 2.33% limit set by USP, the use of NRS slope spectroscopy may be appropriate.

The use of NRS slope spectroscopy affords advantages for determining material concentration in a fluid sample, including the ability to measure concentration more accurately, more rapidly, and in a more dynamic manner. FIG. 2 depicts an absorption spectroscopy apparatus, shown as system 200, in accordance with embodiments of the disclosure. The system 200 may include a compact light source 102, and a variant of the measurement instrument 110, coupled to the compact light source 102, and a detector 112, disposed next to the measurement instrument 110. The compact light source 102 may include one or more light emitting diodes to generate radiation 210 at a targeted wavelength, or wavelengths, as discussed above with respect to FIG. 1A.

In this variant, the measurement instrument 110 includes a movable probe 208 that may be an optical fiber, fibrette, or bundle of fibers, arranged to conduct the radiation 202 to a sample chamber vessel 215 that includes a fluid sample 211, containing a material of interest, whose concentration C is to be measured. The radiation 210 is directed along a probe axis 206 into and through a movable probe 208. As shown in FIG. 2, the movable probe 208 may be translated with respect to a vessel wall 212 of the sample vessel 210, so as to change the path length L of the radiation. In particular, the path length L represents the distance between the probe tip 208A and a lower portion of the vessel wall 212. As such, the value of L corresponds to the distance that the radiation may travel through the sample 182, when the fluid sample is disposed in the sample vessel 215. Note that a window, transparent to radiation 210 may be provided to conduct the radiation out of the sample vessel 215, emerging as attenuated radiation 220, whose intensity I is detected by detector 222. Suitable examples of the detector 112 include a photomultiplier tube, a photodiode, an avalanche photodiodes, a charge-coupled device (CCD), and intensified CCDs, among others. While shown as disposed in a line-of-sight fashion with respect to the probe 172, in various embodiments, the detector 112 may be integrated into the measurement instrument 110B or may be located remotely by operably linking the detector 112 to a light delivery device (not shown) that can carry the electromagnetic radiation the travels through the sample to the detector. The light delivery device may be fused silica, glass, plastic or any transmissible material appropriate for the wavelength range of the electromagnetic source and detector The light delivery device may be formed of a single fiber or of multiple fibers and these fibers may be of different diameters depending on the utilization of the measurement instrument 110. In various non-limiting embodiments the fiber diameter is in the range of from about 0.005 mm to about 20.0 mm.

To facilitate concentration measurements using the approach where $\Delta A/\Delta L$ is equal to eC, a drive component (not separately shown) may be a motor that translates the probe tip 208A along the probe axis 206. The drive component may provide continuous motion or may be set to vary the path length L in precise steps. In various non-limiting embodiments, suitable examples of a drive component include stepper motors, servo, piezo, electric and magnetic motors or any device that can be controlled to provide a variable path length L through a sample. In some embodiments of incremental or step-like motion, the movable probe 208 is moved relative to the sample vessel 215 in increments ranging from 0.2 μm to 1 cm, and more particularly in increments ranging from 1 μm to 50 μm. In other embodiments, the movable probe 208 may be moved in a continuous fashion to vary L continually.

The system 200 further includes a reference detector 204, which detector may function similarly to reference detector 106, to measure the incident intensity $I_0$ of the radiation 210, as generally discussed above. In this embodiment, the system 200 may also include the control system 130. Various inputs to the control system 130 may include the $I_0$, L, and I. In one example, the information concerning L may be sent from a component 214, which component may be a motor assembly, sensor, or other component that provides position information. In some implementations, the control system 130 may determine that the variation in intensity meets a stability criterion, so that the system 200 may be operated in an NRS slope spectroscopy mode, where the position of the movable probe is changed through multiple different locations. Because $I_0$ need not be recorded, at each position of the probe, just the value of L and value of 1 of attenuated radiation 220 are recorded. In this manner, the slope parameter m, which is equal to $\Delta A/\Delta L$, or, equivalently, to eC, may be calculated readily as m=

$$\frac{\Delta A}{\Delta l} = \frac{\log I1 - \log I2}{L2 - L1} \qquad \text{Eq (4)}$$

where $I_1$ is the intensity of the intensity of attenuated radiation at a first probe position, $I_2$ is the intensity of attenuated radiation at a second probe position, $L_1$ is a first path length of the incident radiation through a fluid sample being measured at the first probe position, and $L_2$ is a second path length of the incident radiation through the fluid sample being measured at the second probe position, as discussed above.

Figure 3:
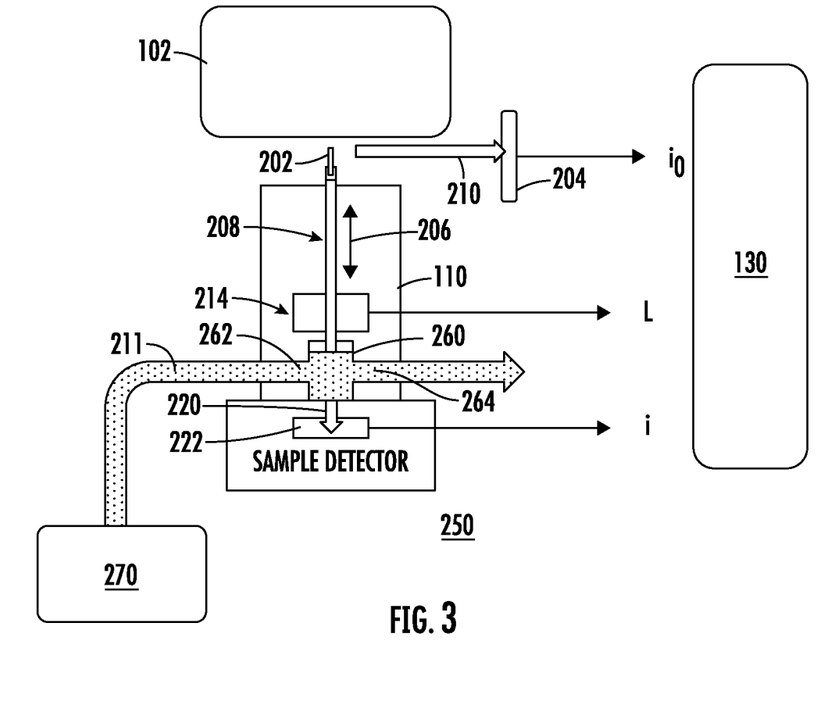
FIG. 3 depicts another absorption spectroscopy apparatus, in accordance with embodiments of the disclosure.

FIG. 3 depicts an absorption spectroscopy apparatus, shown as system 250, in accordance with embodiments of the disclosure. The system 250 may be considered a variant of the system 200, discussed above, where like components are labeled the same. A difference is that the measurement instrument 256 includes a sample chamber vessel 260 includes an inlet port 262 to admit the fluid sample 211; and an outlet port 264 to conduct the fluid sample 211 out of the sample chamber vessel 260. As such, the measurement system 110A may be used to couple to a processing system 270 shown to provide dynamic measurements of a concentration C of a material in a sample fluid, as the sample fluid passes through the measurement instrument 256. As such, the processing system 270 may represent any suitable system generating a fluid sample to be measured, such as a chromatography system, a protein purification system, a filtration systems, or other fluid processing system. Thus, the system 250 provides an architecture to dynamically measure concentration in a fluid sample, where the fluid sample being measured is in flux, and may vary, such as in the concentration C of a material to be measured. An advantage provided by the present approach is that, under conditions where the intensity variation of the light source is below a threshold, meaning a threshold condition or a threshold value, since $I_0$ need not be measured to determine C, just the measurement of transmitted intensity I need be recorded in conjunction with the movement of the probe 208, used to vary L, as given by Eq. (4).

Figure 4:
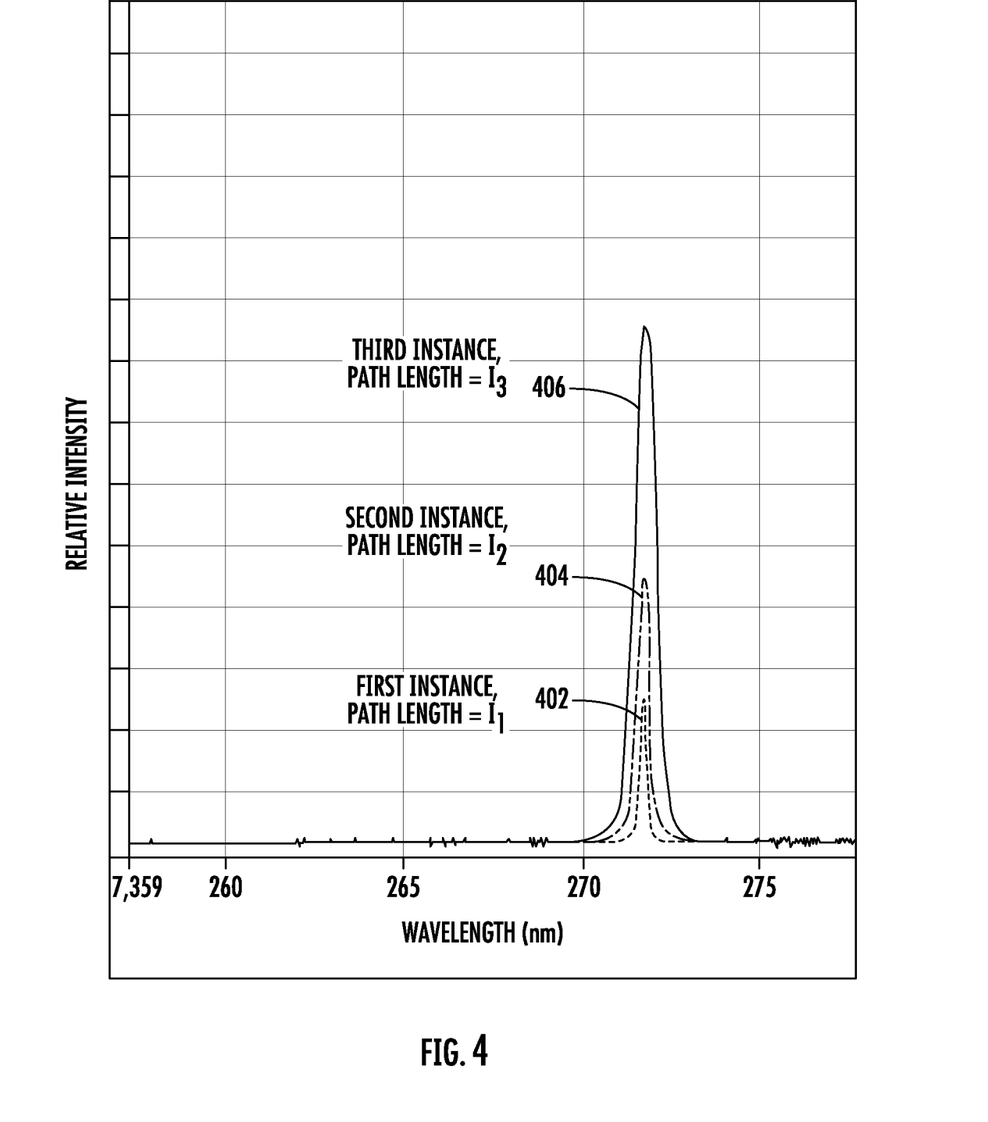
FIG. 4 depicts exemplary absorption spectra, according to embodiments of the disclosure.

To further explain the determination of concentration C using an embodiment of an LED light source, FIG. 4 depicts exemplary absorption spectra, according to embodiments of the disclosure. In this example, the graph of FIG. 4 depicts detected radiation intensity as a function of wavelength in the near UV range. Three spectra, spectrum 402, spectrum 404, and spectrum 406 are shown, each composed of a single peak, representing the detected intensity of UV light emitted from an LED light source.

As such, the spectrum 402 presents data collected at a first instance when the path length of the is directed through a probe that is disposed at a first position, defining a path length $L_1$ through a fluid sample. Likewise, the spectrum 404 presents data collected at a second instance when the path length of the radiation is directed through a probe that is disposed at a second position, defining a path length $L_2$ through the fluid sample. The spectrum 406 presents data collected at a third instance when the path length of the radiation is directed through a probe that is disposed at a second position, defining a path length $L_3$ through the fluid sample. For the time frame represented between the first instance and second instance, given that the concentration C will equal $\Delta A/(\Delta Le)$, the determination of the difference in intensity between spectrum 404 intensity $I_2$ and spectrum 402 intensity $I_1$ will lead directly to C. This is so because $\Delta L$ is merely $L_2-L_1$, and $\Delta A$ is merely log I1–log I2 under conditions of source intensity variability being below an acceptable threshold. Likewise, for the time frame represented between the second instance and third instance, the determination of the difference in intensity between spectrum 406 intensity $I_3$ and spectrum 404 intensity $I_2$ will lead directly to C.

This NRS slope spectroscopy approach may be readily extended to record multiple different measurements of 1 without measuring $I_0$ at multiple different probe positions to more accurately determine concentration, for example. In other words, $I_1$ and $L_1$ are recorded at a first probe position, $I_2$ and $L_2$ are recorded at a second probe position, $I_3$ and $L_3$ are recorded at a third probe position, and so forth. In some implementations, the determination of C may be made in the following manner, where $C=(\Delta A/\Delta L)/e$, according to the Beer Lambert law. The intensity data $I_1$, $I_2$, $I_3$ is converted into absorbance data A (equivalent to log I), by data determining log $I_1$, log $I_2$, log $I_3$, etc. A linear regression is performed based on a set of data plotting A as a function of L for three or more probe positions, in order to determine a regression line whose slope is proportional to $=(\Delta A/\Delta L)$. In this case $\Delta A$ and $\Delta L$ are determined from the values of the respective log/and L values at opposite ends of the regression line, rather than the exact values of $L_1$, $I_1$, $L_n$, and log $I_n$, for example. In this manner, the concentration C that is calculated may more accurately reflect the true value in comparison to a concentration determined from one pair of intensity and path length measurements performed at just two probe positions.

Moreover, since incident intensity measurements are not recorded for the different probe positions, in embodiments of a compact LED light source, overall duration of a set of intensity measurements sufficient to determine C may be shortened to as little as a few seconds.

Figure 5:
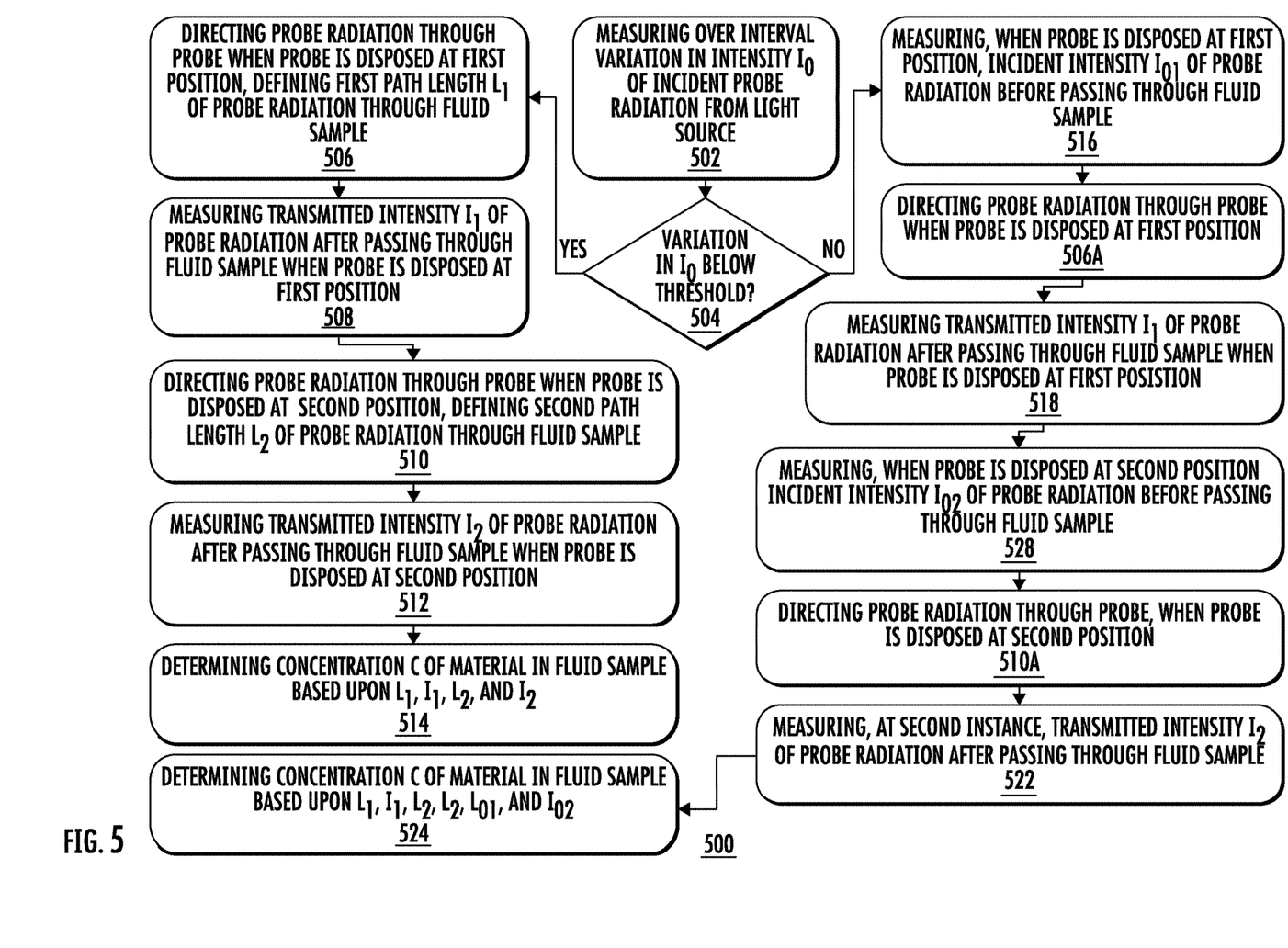
FIG. 5 presents an exemplary process flow.

FIG. 5 presents a process flow 500, according to embodiments to the disclosure. At block 502, the variation in intensity $I_0$ of incident probe radiation is measured from a light source. In some embodiments, the light source may be a known spectrometer, such as a UV/vis or UV/vis/IR spectrometer, arranged to generate radiation over a broad range of wavelengths. In other embodiments, the light source may be a compact LED light source that is based upon a single LED type that emits radiation at a narrow wavelength range, or is based upon a plurality of different LEDs that emit radiation at a plurality of different, narrow wavelength ranges. The variation in intensity may be designated as $\pm\alpha\%$ and may be measured for a given period, such as a predetermined interval of several seconds, or up to several minutes.

At decision block 504 a determination is made as to whether the variation in intensity of $I_0$ is below a threshold. The threshold may be set based upon standards for measuring a given class of materials, for operating a given type or apparatus, or based upon any suitable criterion. In some non-limiting embodiments the threshold value for variation in $I_0$ may be $\pm0.03$, $\pm0.02$, or $\pm0.01$. In the latter case, the stability criterion corresponds equivalently to when $|\alpha|<2.33\%$, where a may be defined by the equations set forth herein.

If so, the flow proceeds to block 506.

At block 506, a probe radiation from the light source is directed through a probe when the probe is disposed at a first position. The probe may be an optical fiber, a fibrette, a bundle of fibers, or other suitable structure that is adapted to conduct the probe radiation. At the first probe position, a probe tip may be disposed near to or within a fluid sample, where the first probe position acts to define a first path length $L_1$ of probe radiation through the fluid sample. In particular, the path length $L_1$ may represent the distance between the probe tip and a wall of a sample vessel or other container that contains the fluid sample.

At block 508, the procedure is performed of measuring, when the probe is disposed at the first position, a transmitted intensity h of the probe radiation after the probe radiation passes through the fluid sample. The transmitted intensity may be measured by any suitable detector, such as an electronic detector adapted to detect radiation over the wavelength range of the probe radiation.

At block 510, the probe radiation from the light source is directed through the probe when the probe is disposed at a second position. The second probe position may define a second path length $L_2$ of probe radiation through the fluid sample.

At block 512, the procedure is performed of measuring, when the probe is disposed at the second position, a transmitted intensity $I_2$ of the probe radiation after the probe radiation passes through the fluid sample.

At block 514, the procedure is performed of determining a concentration C of a material in the fluid sample based upon $L_1$, log $I_1$, $L_2$, and log $I_2$. For example, the concentration C may be calculated in accordance with the Beer Lamber law as $C=(\Delta A/\Delta L)/e$, where $\Delta L$ is given by $|L_1-L_2|$ and $\Delta A$ is given by log $I_1$–log $I_2$.

If, at decision block 504, the determination is made that the variation in $I_0$ is not below the threshold, the flow proceeds to block 516. At block 516, the operation is performed of measuring, when the probe is disposed at a first position, an incident intensity $I_{01}$ of probe radiation before passing through a fluid sample to be measured. This measurement may represent a first measurement in a series of absorbance measurements for a material in the fluid sample, for instance.

In this circumstance, the flow proceeds to block 506A, generally performed according to block 506, described previously.

After block 506A, the flow proceeds to block 518, where the transmitted intensity $I_1$ is measured of the probe radiation after passing through fluid sample when the probe is disposed at the first position. Note that the operations of block 516, 518, and 506A may be performed essentially concurrently.

The flow then proceeds to block 520 where the operation is performed of measuring, when the probe is disposed at a second position, the incident intensity $I_{02}$ of probe radiation before passing through the fluid sample.

In this circumstance, the flow proceeds to block 510A, generally performed according to block 510, described previously. After block 510A, the flow proceeds to block 522, where the transmitted intensity $I_2$ is measured of the probe radiation after passing through the fluid sample when the probe is disposed at a second position. Note that the operations of block 520, 522, and 510A may be performed essentially concurrently.

The flow then proceeds to block 524 where the operation of determining a concentration C of material in the fluid sample is performed, based upon $L_1$, $I_1$, $L_2$, $I_2$, $I_{01}$ and $I_{02}$. For example, the concentration C may be calculated in accordance with the Beer Lamber law as $C=(\Delta A/\Delta L)/e$, where $\Delta L$ is given by $|L_1-L_2|$ and $\Delta A$ is given by log $I_1$–log $I_2$+log $(I_{01}/I_{02})$.

Figure 6:
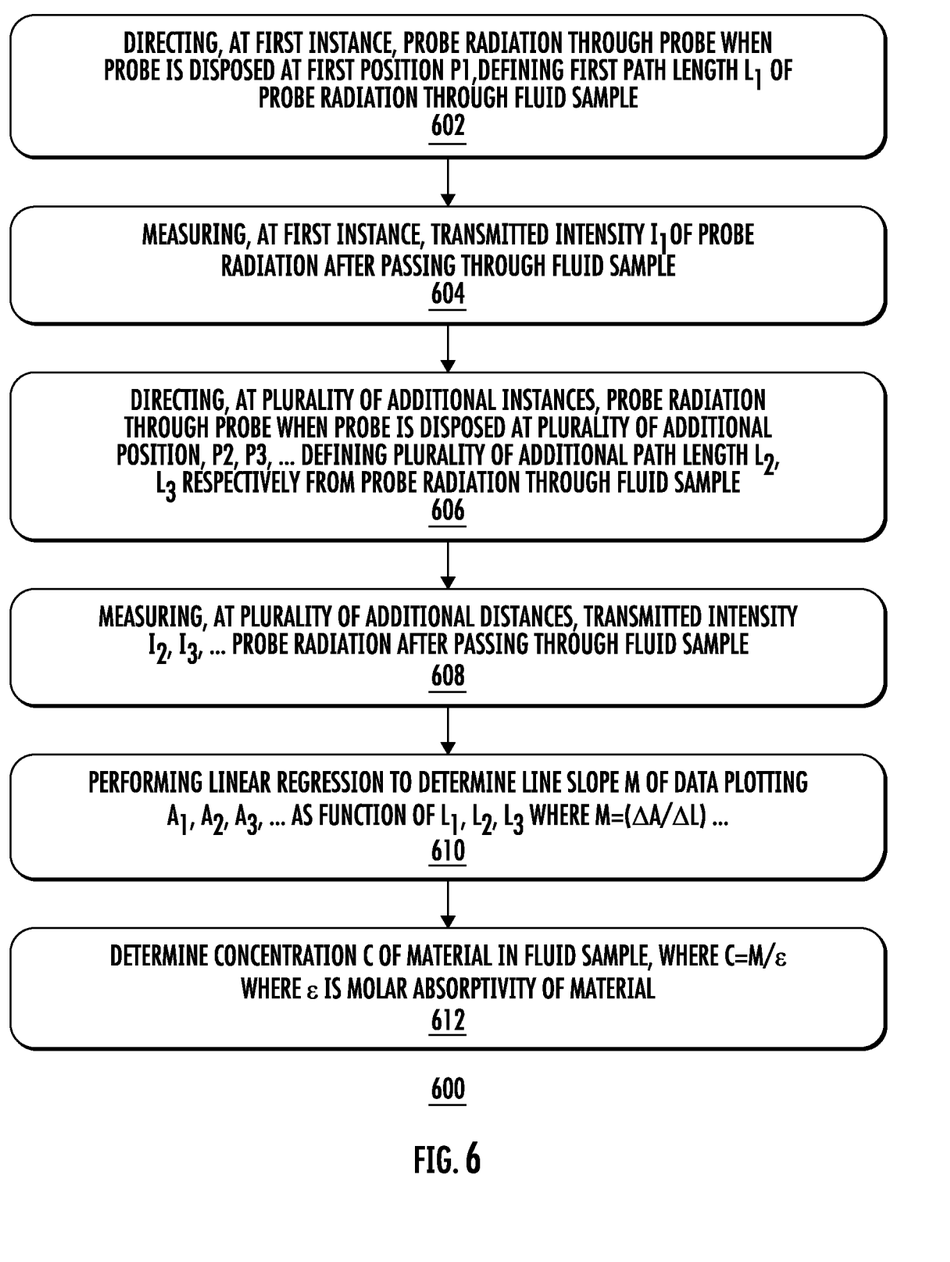
FIG. 6 presents another exemplary process flow.

FIG. 6 presents another process flow 600, according to embodiments to the disclosure. At block 602, the operation is performed of directing, at a first instance, probe radiation through a probe when the probe is disposed at first position p1, defining a first path length $L_1$ of probe radiation through a fluid sample. The probe radiation may be generated by a light such as a known spectrometer, such as a UV/vis or UV/vis/IR spectrometer, arranged to generate radiation over a broad range of wavelengths. In other embodiments, the light source may be a compact LED light source that is based upon a single LED type that emits radiation at a narrow wavelength range, or is based upon a plurality of different LEDs that emit radiation at a plurality of different, narrow wavelength ranges.

At block 604, the transmitted intensity $I_1$ of the probe radiation after passing through the fluid sample at the first instance is measured.

At block 606 the operation is performed of directing, at a plurality of additional instances, probe radiation through probe when probe is disposed at a plurality of additional positions, p2, p3, . . . defining a plurality of additional path lengths $L_2$, $L_3$, respectively, for the probe radiation through the fluid sample.

At block 608, the operation is performed of measuring a transmitted intensity $I_2$, $I_3$, . . . of probe radiation, after passing through the fluid sample at the plurality of additional distances, respectively.

At block 610, the operation involves performing a linear regression to determine a line slope m of a set of data plotting $A_1$, $A_2$, $A_3$, . . . as a function of $L_1$, $L_2$, $L_3$, where m is determined from the ratio of the change in absorbance to the change in path length. In order to determine $A_1$, $A_2$, etc., the intensity data $I_1$, $I_2$, etc., is converted into the absorbance data, by determining log $I_1$, log $I_2$, etc. Said differently, the linear regression is performed on a set of data that is constructed from a plurality of data points, where the data points represent, for example, $A_1$, $L_1$; $A_2$, $L_2$; $A_3$, $L_3$; and so forth. In particular, the linear regression performed in block 610 is used to define a line that best fits the set of A,L data points, where the slope of the fit line defines an effective value of m.

At block 612, the operation is performed of determining a concentration C of a material in the fluid sample, where C=m/e where e is molar absorptivity of the material, and m is determined as in block 610.

While the present arrangement has been disclosed with reference to certain embodiments, numerous modifications, alterations and changes to the described embodiments are possible without departing from the spirit and scope of the disclosed arrangement, as defined in the appended claims. Accordingly, it is intended that the present arrangement not be limited to the described embodiments, but that it has the full scope defined by the language of the following claims, and equivalents thereof.

The invention claimed is:

1. A method of determining a concentration of a material, comprising:
   determining whether a variation in an intensity of a probe radiation emitted by a light source of an absorbance spectroscopy system meets a stability criterion;
   directing the probe radiation through a probe when the probe is disposed at a first position, defining a first path length $L_1$ of the probe radiation through a fluid sample containing the material;
   measuring a transmitted intensity $I_1$ of the probe radiation after passing through the fluid sample when the probe is disposed at the first position;
   directing the probe radiation through the probe when the probe is disposed at a second position, defining a second path length $L_2$ of the probe radiation through the fluid sample;
   measuring a transmitted intensity $I_2$ of the probe radiation after passing through the fluid sample when the probe is disposed at the second position; and
   determining a concentration C of a material in the fluid sample based upon $L_1$, $I_1$, $L_2$, and $I_2$, when the stability criterion is met;
   wherein the stability criterion comprises a state of the light source wherein the variation in the intensity is below a threshold value, the method further comprising, when the variation in the intensity is greater than the threshold value;
   measuring an incident intensity $I_{01}$ of the probe radiation, before passing through the fluid sample when the probe is disposed at the first position;
   measuring an incident intensity $I_{02}$ of the probe radiation, before passing through the fluid sample when the probe is disposed at the second position; and
   determining the concentration C of material in the fluid sample, based upon $L_1$, $I_1$, $L_2$, $I_2$, $I_{01}$ and $I_{02}$.

2. The method of claim 1, wherein when the stability criterion is met the concentration C is determined as:
   C=($\Delta$A/$\Delta$L)/e, where e is molar absorptivity of the material, $\Delta$L is an absolute value of a difference between $L_1$ and $L_2$, and $\Delta$A=log $I_1$–log $I_2$.

3. The method of claim 1, wherein the variation in the intensity of the probe radiation is given by a, where a=($I_{max}$–$I_{min}$)/$I_{min}$, where $I_{max}$ is a maximum value of intensity of radiation recorded in a given period and $I_{min}$ is a minimum value of intensity recorded in the given period.

4. The method of claim 3, wherein a duration of the given period is one second to 100 seconds.

5. The method of claim 1, wherein an incident intensity of the probe radiation before passing through the fluid sample is not measured at the first position or at the second position when the stability criterion is met.

6. The method of claim 1, wherein the transmitted intensity $I_1$ and the transmitted intensity $I_2$ are determined by a measurement instrument of the absorbance spectroscopy system, the measurement instrument comprising:
   a sample vessel to contain the fluid sample, the sample vessel comprising a vessel wall, wherein the probe is movable along a probe direction with respect to the vessel wall, so as to change a path length of the probe signal through the fluid sample from the first path length $L_1$ to the second path length $L_2$.

7. The method of claim 1, wherein C=($\Delta$A/$\Delta$Z)/e, where $\Delta$L is given by $|L_1-L_2|$ and $\Delta$A is given by log $I_1$–log $I_2$+log ($I_{01}/I_{02}$).

8. The method of claim 1, wherein the probe is disposed at the first position during a first instance, and is disposed at the second position during a second instance, the method further comprising:
   directing, for at least one additional instance, the probe radiation through the probe when the probe is disposed in at least one additional position, defining a at least one additional path length $L_n$, respectively, for the probe radiation through the fluid sample;
   measuring, at the at least one additional instance, a transmitted intensity $I_n$ of the probe radiation after passing through the fluid sample; and
   performing a linear regression to determine a line slope m of a set of data plotting $A_1$, $A_2$, $A_n$, . . . as a function of $L_1$, $L_2$, $L_n$, where A is equal to log I.

9. A non-transitory computer-readable storage medium storing computer-readable program code executable by a processor to:
   determine whether a variation in an intensity of a probe radiation emitted by a light source of an absorbance spectroscopy system meets a stability criterion;
   cause the light source to direct the probe radiation through a probe when the probe is disposed at a first position, defining a first path length $L_1$ of the probe radiation through a fluid sample;
   receive a transmitted intensity $I_1$ of the probe radiation after passing through the fluid sample;
   cause the light source to direct the probe radiation through the probe when the probe is disposed at a second position, defining a second path length $L_2$ of the probe radiation through the fluid sample;
   receive a transmitted intensity $I_2$ of the probe radiation after passing through the fluid sample; and determine a concentration C of a material in the fluid sample based upon $L_1$, $I_1$, $L_2$, and $I_2$, when the variation in the intensity meets the stability criterion;

wherein when the variation in the intensity does not meet the stability criterion, the computer-readable program code is executable by a processor to:

receive, when the probe is disposed at the first position, an incident intensity $I_{01}$ of the probe radiation, before passing through the fluid sample;

receive, when the probe is disposed at the second position, an incident intensity $I_{02}$ of the probe radiation, before passing through the fluid sample; and determine the concentration C of material in the fluid sample based upon $L_1$, $I_1$, $L_2$, $I_2$, $I_{01}$ and $I_{02}$.

10. The non-transitory computer-readable storage medium of claim 9, wherein the concentration C is determined as: o $C=(\Delta A/\Delta L)/e$, where e is molar absorptivity of the material, $\Delta L$ is an absolute value of a difference between $L_1$ and $L_2$, and $\Delta A = \log I_{01} - \log I_{02}$.

11. The non-transitory computer-readable storage medium of claim 9, wherein the variation the intensity of the probe radiation is given by v, where $v=(I_{max}-I_{min})/I_{min}$, where $I_{max}$ is a maximum value of intensity of radiation recorded in a given period and $I_{min}$ is a minimum value of intensity recorded in the given period, wherein the stability criterion is met when v is below a threshold value.

12. The non-transitory computer-readable storage medium of claim 9, the computer-readable program code executable by the processor to determine the concentration C without receiving measurement of an incident intensity $I_{01}$ of the probe radiation at the first position, before passing through the fluid sample, and without receiving measurement of an incident intensity $I_{02}$ of the probe radiation at the second position, before passing through the fluid sample, when the variation in the intensity meets the stability criterion.

13. The non-transitory computer-readable storage medium of claim 9, the computer-readable program code executable by the processor to determine C by calculating a change in absorbance $\Delta A$ from the first instance to the second instance, wherein $C=(\Delta A/\Delta L)/e$, where $\Delta L$ is given by $|L_1-L_2|$ and $\Delta A$ is given by $\log I_1 - \log I_2, +\log (I_{01}/I_{02})$.

14. The non-transitory computer-readable storage medium of claim 9, wherein the probe is disposed at the first position during a first instance, and is disposed at the second position during a second instance, the computer-readable program code executable by the processor to:

for at least one additional instance, cause the source to direct the probe radiation through the probe when probe is disposed in at least one additional position, defining at least one additional path length $L_n$, respectively, for the probe radiation through the fluid sample;

measure, at the at least one additional instance, a transmitted intensity $I_n$ of the probe radiation after passing through the fluid sample; and perform a linear regression to determine a line slope m of a set of data plotting $A_1$, $A_2$, $A_n$, . . . as a function of $L_1$, $L_2$, $L_n$, where A is equal to log I.

15. A measurement apparatus, comprising:
a light source, to generate a probe signal; and
a measurement instrument, to receive the probe signal, the measurement instrument comprising:
a sample vessel to contain a fluid sample, the sample vessel comprising a vessel wall;
a probe, arranged to direct the probe signal through the sample vessel, wherein the probe is movable along a probe direction with respect to the vessel wall, so as to change a path length/of the probe signal through the fluid sample;

a detector, disposed to receive the probe signal after passing through the vessel wall; and a control system, arranged to:
determine whether a variation in an intensity of a probe radiation emitted by the light source meets a stability criterion; and calculate a concentration C of a material in the fluid sample based upon a measured change in intensity of the probe signal as a function of a change in the path length L, when the variation in the intensity meets the stability criterion;

wherein the stability criterion comprises a state of the light source wherein the variation in the intensity is below a threshold value, when the variation in the intensity is greater than the threshold value, the control system is arranged to:

measure an incident intensity $I_{01}$ of the probe radiation, before passing through the fluid sample when the probe is disposed at the first position;

measure an incident intensity $I_{02}$ of the probe radiation, before passing through the fluid sample when the probe is disposed at the second position; and determine the concentration C of material in the fluid sample, based upon $L_1$, $I_1$, $L_2$, $I_2$, $I_{01}$ and $I_{02}$.

16. The measurement apparatus of claim 15, the control system being arranged to:

receive, when the probe is disposed at a first position, a transmitted intensity 17 of the probe radiation after passing through the fluid sample;

receive, when the probe is disposed at a second position, a transmitted intensity $I_2$ of the probe radiation after passing through the fluid sample; and to calculate C as $(\Delta A/\Delta L)/e$, where e is molar absorptivity of the material, $\Delta L$ is an absolute value of a difference between $L_1$ and $L_2$, and $\Delta A = \log I_{01} - \log I_{02}$ and wherein $L_1$ is a first path length at the first position, and $L_2$ is a second path length at the second position.

17. The measurement apparatus of claim 16, the control system being arranged to: determine the concentration C without receiving measurement of an incident intensity $I_{01}$ of the probe radiation at the first position, before passing through the fluid sample, and without receiving measurement of an incident intensity $I_{02}$ of the probe radiation at the second position, before passing through the fluid sample, when the variation in the intensity meets the stability criterion.

18. The measurement apparatus of claim 15, the light source comprising a light emitting diode (LED) to generate radiation at a targeted wavelength, in a range of ultraviolet to infrared.

19. The method of claim 1, wherein the concentration C of material in the fluid sample is determined based on a difference between log $LI_{01}$ and log $LI_{02}$ without regard to the absolute values of absorbance of $L_1$ and $L_2$.

20. The non-transitory computer-readable storage medium of claim 9,
wherein the concentration C of material in the fluid sample is determined based on a difference between log $LI_{01}$ and log $LI_{02}$ without regard to the absolute values of absorbance of $L_1$ and $L_2$.

21. The measurement apparatus of claim 15, wherein the concentration C of material in the fluid sample is determined based on a difference between $\log LI_{01}$ and $\log LI_{02}$ without regard to the absolute values of absorbance of $L_1$ and $L_2$.

* * * * *

UNITED STATES PATENT AND TRADEMARK OFFICE
CERTIFICATE OF CORRECTION

| | | |
|---|---|---|
| PATENT NO. | : 12,411,043 B2 | Page 1 of 1 |
| APPLICATION NO. | : 18/198513 | |
| DATED | : September 9, 2025 | |
| INVENTOR(S) | : Matthew Muller et al. | |

It is certified that error appears in the above-identified patent and that said Letters Patent is hereby corrected as shown below:

In the Claims

Column 14, Claim 7, Line 32, replace "C=(ΔA/ΔZ)/e" with -- $C = (\Delta A/\Delta L)/e$ --;

Column 16, Claim 16, Line 33, replace "intensity 17" with -- intensity $I_1$ --.

Signed and Sealed this
Ninth Day of December, 2025

John A. Squires
*Director of the United States Patent and Trademark Office*